United States Patent Office 2,887,432
Patented May 19, 1959

2,887,432
DIALKOXYPHOSPHINOTHIOYLTHIO-S-TRIAZINES

Joseph W. Baker, Nitro, and Kenneth L. Godfrey, St. Albans, W. Va., assignors to Monsanto Chemical Company, St. Louis, Mo., a corporation of Delaware No Drawing. Application June 28, 1956
Serial No. 594,388

11 Claims. (Cl. 167—33)

The present invention relates to a new group of chemical products of the class known as triazines as well as to a method of producing the same. More particularly, the invention relates to new products included within the class named which are dialkoxyphosphinothioyl-thiotriazines which new products may contain, as will be shown in the examples that follow, from one to three of the alkoxyphosphinothioylthio groups and where one or two of the last named groups are present, then additionally there will be included two or one halogen atoms respectively. As will hereinafter be shown in detail, various of the products within the class as named have been found useful as insecticides.

The new compounds are represented by the following general formula

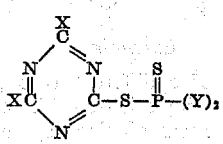

wherein X represents either a halogen atom or a dialkoxyphosphinothioylthio group and Y represents an alkoxy group.

A procedure whereby the products included in the preferred class of substituted triazines as set forth above are prepared is described in the various examples that follow:

Example 1

In a reaction vessel equipped with a stirrer and a reflux condenser, 46.1 parts (0.25 mole) of cyanuric chloride were dissolved in approximately 300 parts of benzene and then 50.8 parts (0.25 mole) of S-ammonium O,O-diethyl phosphorodithioate were added and the mixture stirred for about three-fourths of an hour at room temperature. Thereupon the temperature was slowly increased to the temperature of reflux and the mixture allowed to reflux for about 1.5 hours. The mixture was then cooled and washed once with water and the solvent was then removed under reduced pressure. A grey solid product was obtained which was 2,4-dichloro-6-(diethoxyphosphinothioylthio)-s-triazine. The product possesses the empirical formula $C_7H_{10}Cl_2N_3O_2PS_2$ which was identified by analysis as follows:

|  | Percent Theory | Percent Found |
| --- | --- | --- |
| Phosphorus | 9.2 | 8.7 |
| Chlorine | 21.2 | 20.3 |
| Sulfur | 19.2 | 19.7 |

The reaction involved in the above example is as follows:

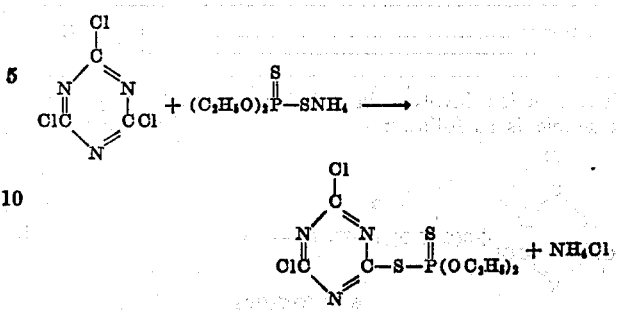

Example 2

As another example of the invention, 2-chloro-4,6-bis-(diethoxyphosphinothioylthio)-s-triazine was obtained by dissolving 36.9 parts (0.2 mole) of cyanuric chloride in approximately 350 parts of dry benzene. To the solution there were added 81.3 parts (0.4 mole) of S-ammonium O,O-diethyl phosphorodithioate at a temperature of between 10–12° C. There was no observable evolution of heat. The mixture was agitated and slowly heated to 20–30° C. for 1 hour, then at 35–45° C. for 1 hour, then at 55–65° C. for 1 hour and finally at 75° C. for 1 hour. Thereupon the by-product ammonium chloride was filtered off, and the filtrate was extracted once with sodium bicarbonate solution followed by two water washes. The solvent was then removed under reduced pressure. An amber colored viscous liquid was obtained which was soluble in ether, acetone, benzene, chloroform, ethanol and ethyl acetate. The empirical formula for the product named at the start of this example is $C_{11}H_{20}ClN_3O_4P_2S_4$ and analysis of the reaction product obtained yielded the following results:

|  | Percent Theory | Percent Found |
| --- | --- | --- |
| Phosphorus | 12.8 | 13.2 |
| Chlorine | 7.4 | 7.6 |
| Nitrogen | 8.7 | 8.7 |

The reaction involved in the present example is illustrated as follows:

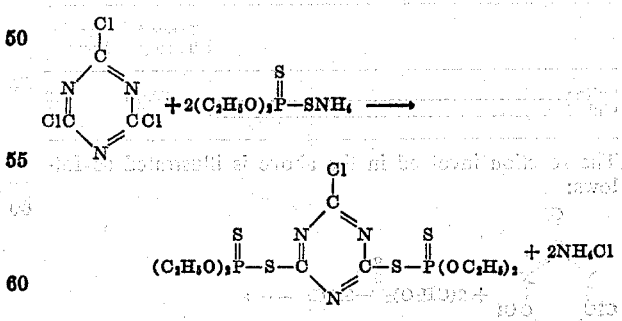

Example 3

Proceeding as described in Example 2, but employing as a charge 18.4 parts (0.1 mole) of cyanuric chloride, 225 parts of dry benzene and 81.3 parts (0.4 mole) of S-ammonium O,O-diethyl phosphorodithioate there was obtained in 95% theory yield a dark grey viscous liquid which was 2,4,6-tris(diethoxyphosphinothioylthio)-s-triazine having the empirical formula $C_{15}H_{30}N_3O_6P_3S_6$. The product showed the same solubility characteristics as did the product of Example 2. Analysis of the product gave the following results:

|  | Percent Theory | Percent Found |
| --- | --- | --- |
| Phosphorus | 14.6 | 14.6 |
| Nitrogen | 6.6 | 6.2 |

The reaction involved in forming the product of this example is as follows:

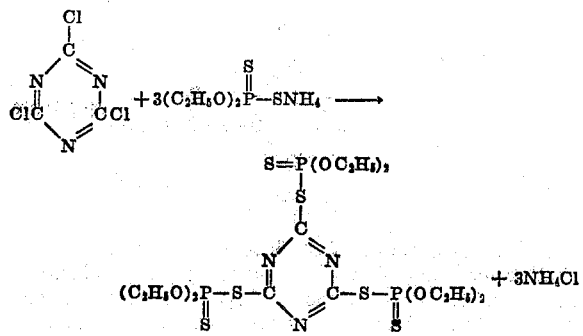

Example 4

As another example of the invention, 2,4-bis(dimethoxyphosphinothioylthio)-6-chloro-s-triazine was produced by mixing in a vessel equipped with temperature recording means, an agitator and a reflux condenser, 70.1 parts (0.4 mole) of S-ammonium O,O-dimethyl phosphorodithioate, 36.9 parts (0.2 mole) of cyanuric chloride and 300 parts of chloroform. The mixture was made at about 10° C. and the temperature slowly raised to 30° C. during about 45 minutes, then held between 30–35° C. for about an hour. The temperature was then increased slowly to about 45° C. and held at 45–50° C. for about an hour. Thereupon, the temperature was increased to the refluxing point and held thereat for about 4 hours. The mass was allowed to cool and the by-product salt separated by filtration. The filtrate was washed with a sodium bicarbonate solution followed by two washes with water. The solvent was then removed by heating under reduced pressure and the product obtained as a viscous yellow to orange colored liquid. The product was soluble in benzene, acetone, chloroform, ethanol and ethyl acetate and slightly soluble in ether and heptane. The expected product as named above possesses the empirical formula $C_7H_{12}ClN_3O_4P_2S_4$ and was so identified by analysis.

|  | Percent Theory | Percent Found |
| --- | --- | --- |
| Sulfur | 30.0 | 29.9 |
| Chlorine | 8.3 | 8.5 |

The reaction involved in the above is illustrated as follows:

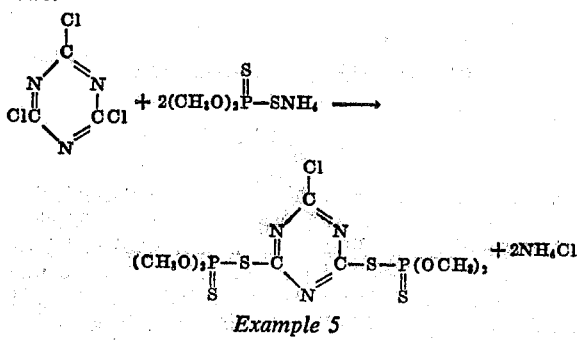

Example 5

As another example of the invention, 2,4,6-tris(dimethoxyphosphinothioylthio)-s-triazine was prepared by mixing in the same type equipment previously described, 105.1 parts (0.6 mole) of S-ammonium O,O-dimethyl phosphorodithioate, 36.9 parts (0.2 mole) of cyanuric chloride and 265 parts of dry benzene. The mix was slowly heated to a refluxing temperature (about 82° C.) and held thereat for about 7 hours. The by-product salt was filtered off after cooling and the filtrate washed successively with sodium bicarbonate solution and twice with water. After removal of the solvent under reduced pressure a waxy tan colored solid was obtained which was soluble as described in Example 4. The empirical formula of the product named above is $C_9H_{18}N_3O_6P_3S_6$ and this was confirmed by analysis as is now shown:

|  | Percent Theory | Percent Found |
| --- | --- | --- |
| Phosphorus | 16.9 | 17.4 |
| Sulfur | 35.0 | 33.1 |
| Nitrogen | 7.6 | 7.2 |

The chemical reaction involved is shown as follows:

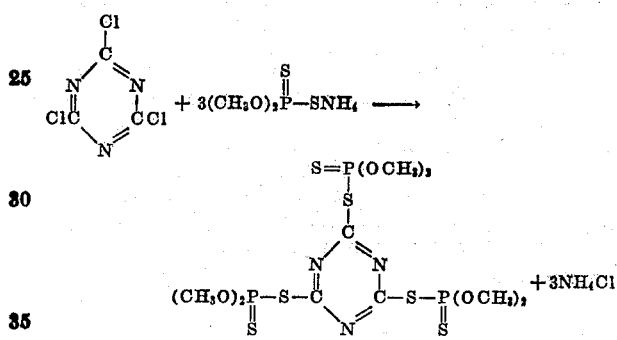

Example 6

As an example of a different type product, 2,4-bis-(diethoxyphosphinothioylthio)-6 - (dimethoxyphosphinothioylthio)-s-triazine was obtained by following the procedure of Example 5 but using as a charge 96.8 parts (0.2 mole) of 2-chloro-4,6-bis-(diethoxyphosphinothioylthio)-s-triazine (the product obtained in Example 2 hereof), 35.0 parts (0.2 mole) of S-ammonium O,O-dimethyl phosphorodithioate and 175 parts of dry benzene. After mixing the mass was heated for about 5 hours at reflux and then treated as described in the previous examples. A viscous tan colored liquid was obtained and possessed the same characteristics in solvents typical of the class and as previously stated. The constitution of the product was confirmed by analysis. The reaction involved was as follows:

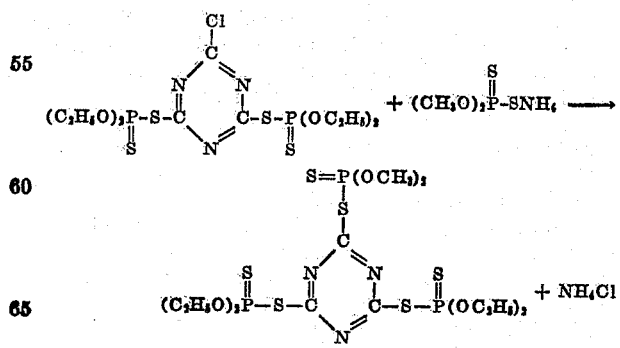

Example 7

Another example of the wide scope of the present invention is seen in the production of 2,4-bis(diethoxyphosphinothioylthio)-6-(diisopropylphosphinothioylthio)-s-triazine which was obtained by charging 81.3 parts (0.4 mole) of S-ammonium O,O-diethyl phosphorodithioate and 36.9 parts (0.3 mole) of cyanuric chloride into 400 parts of dry benzene. The mixture was kept at about 10° C. and then slowly heated to 30° C. and held thereat for about an hour, then raised to 45° C. and held thereat for an hour, then held at 65° C. for an hour and finally heated at reflux for an hour. The mixture was then cooled to room temperature and 46.2 parts (0.2 mole) of S-ammonium O,O-diisopropyl phosphorodithioate added and the entire mixture then heated and allowed to reflux for about 3 hours. After filtering to remove the by-product salt, the benzene solution was washed with 5% sodium carbonate solution and twice with water and the benzene removed under reduced pressure. A light yellow viscous liquid was obtained whose empirical formula $$C_{17}H_{34}N_3O_6P_3S_6$$

was confirmed by analysis. Solubility of the product was similar to the other triazines. The reactions involved are shown below:

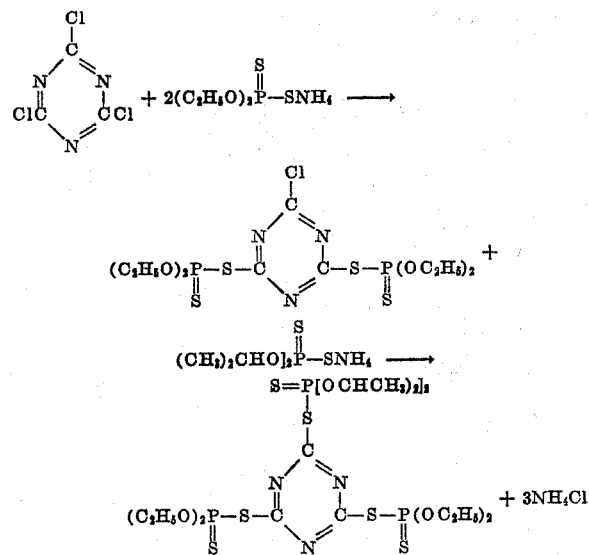

The insecticidal activity of the substituted triazines set forth has been investigated. The products were prepared in the form of aqueous emulsions of the concentrations stated and infested and uninfested leaves of plants dipped thereinto. Contact effects were observed on the infested leaves and residual effects were observed on the clean leaves infested subsequent to treatment. On the dipped infested plants 97% kill was observed of the two-spotted spider mite in 0.1% concentration of the product of Example 2, with 100% destruction of eggs and 100% residual activity. The same product in 1% concentration gave 100% kill of large milkweed bug nymphs in residual action and 74% kill of yellow fever mosquito larvae in 0.01% concentration. The product of Example 3 showed similar results in the same concentration tested with the same insects. Likewise, the products of Examples 6 and 7 were active against mites and mosquito larvae in contact tests and active against milkweed bug nymphs and red flour beetles in residue tests.

The new compounds are insoluble in water but soluble in common organic solvents and may be applied as solutions for destruction of a variety of insect pests in their environment but for use on living plants are preferably applied as aqueous dispersions. The addition of surface active agents aids the preparation of dispersions. Emulsifiable concentrates prepared by dissolving the toxicant and an emulsifying agent in a water immiscible solvent are especially convenient for formulation of agricultural sprays. Alternatively, the compounds may be applied as dusts wherein the active ingredient is distributed over a dry, free-flowing powder, as for example clays, including bentonite, and Attapulgite or such materials as talc, diatomaceous earth, fuller's earth, chalk or calcium carbonate. The required concentrations of active ingredient are small because of the high effectiveness of the new compounds. Sprays for application to agricultural crops may suitably be applied at concentrations of 0.001–1.0%.

It is intended to cover all changes and modifications of the examples of the invention herein chosen for purposes of disclosure which do not constitute departures from the spirit and scope of the invention.

What is claimed is:

1. A compound of the structure

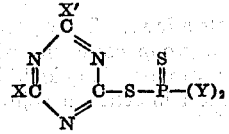

wherein Y represents a lower alkoxy group and X and X' are selected from a group consisting of halogen atoms and a di(lower alkoxy)phosphinothioylthio group.

2. A compound of the structure

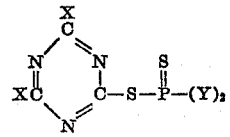

wherein Y represents a lower alkoxy group and one X represents halogen and the other X represents a di(lower alkoxy)phosphinothioylthio group.

3. A compound of the structure

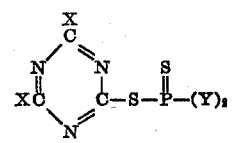

wherein Y represents a lower alkoxy group and X represents a di(lower alkoxy)phosphinothioylthio group, the said alkoxy groups containing at least two but not more than three carbon atoms.

4. A triazine of the structure

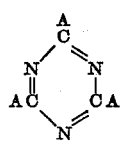

wherein A represents di(lower alkoxy)phosphinothioylthio groups, two of which are diethoxyphosphinothioylthio and the other a different di(lower alkoxy)phosphinoylthio group.

5. A triazine of the structure

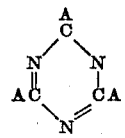

wherein A represents dialkoxyphosphinothioylthio groups, said alkoxy groups containing at least two but less than four carbon atoms.

6. 2 - chloro - 4,6 - bis(diethoxyphosphinothioylthio)-s-triazine.

7. 2,4,6 - tris(diethoxyphosphinothioylthio) - s - triazine.

8. 2,4 - bis(diethoxyphosphinothioylthio) - 6 - (dimethoxyphosphinothioylthio)-s-triazine.

9. 2,4 - bis(diethoxyphosphinothioylthio) - 6 - (diisopropylphosphinothioylthio)-s-triazine.

10. The method which consists essentially in mixing one molecular proportion of cyanuric chloride with one of four molecular proportions of a member of the group consisting of alkali metal and ammonium salts of di-(lower alkyl)phosphorodithioic acid and heating to introduce the di(lower alkoxy)phosphinothioylthio group into the triazine nucleus in place of chlorine.

11. An insecticidal composition consisting essentially of a minor proportion sufficient to destroy insects of an insecticide of the structure

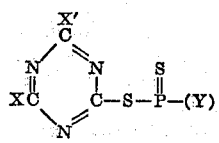

wherein Y represents a lower alkoxy group and X and X' are selected from a group consisting of halogen atoms and di(lower alkoxy)phosphinothioylthio and a major proportion of an inert insecticidal adjuvant as a carrier therefor.

References Cited in the file of this patent

UNITED STATES PATENTS

| | | |
|---|---|---|
| 2,685,581 | Coover | Aug. 3, 1954 |

FOREIGN PATENTS

| | | |
|---|---|---|
| 1,063,067 | France | Dec. 16, 1953 |
| 910,652 | Germany | May 3, 1954 |
| 936,690 | Germany | Dec. 22, 1955 |
| 713,278 | Great Britain | Aug. 11, 1954 |
| 268,725 | Italy | Oct. 29, 1929 |

OTHER REFERENCES

Kosolapoff: Organo-phosphorous Compounds, John Wiley and Sons, 1950, pp. 123–124.